US012654931B2

(12) United States Patent
Yang et al.

(10) Patent No.: US 12,654,931 B2
(45) Date of Patent: Jun. 16, 2026

(54) COMPOSITIONS AND MATERIALS FOR ODOR REDUCING ARTICLES INCLUDING TRASH BAGS

(71) Applicant: simplehuman, LLC, Torrance, CA (US)

(72) Inventors: Frank Yang, Rancho Palos Verdes, CA (US); Ryan Wong, Long Beach, CA (US)

(73) Assignee: simplehuman, LLC, Torrance, CA (US)

( * ) Notice: Subject to any disclaimer, the term of this patent is extended or adjusted under 35 U.S.C. 154(b) by 303 days.

(21) Appl. No.: 17/570,132

(22) Filed: Jan. 6, 2022

(65) Prior Publication Data

US 2022/0212862 A1 Jul. 7, 2022

Related U.S. Application Data

(60) Provisional application No. 63/134,874, filed on Jan. 7, 2021.

(51) Int. Cl.
*B29C 48/10* (2019.01)
*B29C 48/00* (2019.01)
(Continued)

(52) U.S. Cl.
CPC ........ *B65F 1/0026* (2013.01); *B29C 48/0018* (2019.02); *B29C 48/10* (2019.02); *B29C 48/21* (2019.02); *B32B 1/00* (2013.01); *B32B 27/08* (2013.01); *B32B 27/20* (2013.01); *B32B 27/32* (2013.01); *C08J 5/18* (2013.01); *C08L 23/04* (2013.01); *B29K 2023/0625* (2013.01); *B29K 2105/0041* (2013.01);
(Continued)

(58) Field of Classification Search
CPC ... B65F 1/0026; B29C 48/0018; B29C 48/10; B29C 48/21; B32B 1/00; B32B 27/08; B32B 27/20; B32B 27/32
USPC .............................................. 383/1
See application file for complete search history.

(56) References Cited

U.S. PATENT DOCUMENTS

| | | | | |
|---|---|---|---|---|
| 4,961,930 A | * | 10/1990 | Perdelwitz, Jr. ..... | A01K 1/0353 |
| | | | | 119/28.5 |
| 5,819,688 A | * | 10/1998 | Walker ................. | A01K 1/0107 |
| | | | | 119/169 |

(Continued)

FOREIGN PATENT DOCUMENTS

| | | |
|---|---|---|
| DE | 19954404 A1 | 5/2001 |
| EP | 2261022 A3 | 1/2012 |

OTHER PUBLICATIONS

European Extended Search Report, 22150421.0, dated May 31, 2022, 8 pages.
Canadian Office Action, 3144932, dated Nov. 9, 2022, 4 pages.

*Primary Examiner* — Peter N Helvey
(74) *Attorney, Agent, or Firm* — Knobbe, Martens, Olson & Bear, LLP

(57) ABSTRACT

Disclosed herein are polymer-based films (and articles of manufacture made therefrom or comprising thereof). In several embodiments, the film comprises biodegradable polymers. In several embodiments, the film comprises post-consumer recycled material. In several embodiments, the film comprises an odor absorbing agent (e.g., carbon). In several embodiments, an article of manufacture comprising a film as disclosed herein or the film itself is biodegradable.

27 Claims, 4 Drawing Sheets

200

(51) Int. Cl.

| | |
|---|---|
| *B29C 48/21* | (2019.01) |
| *B32B 1/00* | (2006.01) |
| *B32B 27/08* | (2006.01) |
| *B32B 27/20* | (2006.01) |
| *B32B 27/32* | (2006.01) |
| *B65F 1/00* | (2006.01) |
| *C08J 5/18* | (2006.01) |
| *C08L 23/04* | (2006.01) |
| *B29K 23/00* | (2006.01) |
| *B29K 105/00* | (2006.01) |
| *B29L 31/00* | (2006.01) |

(52) U.S. Cl.
CPC . *B29K 2995/006* (2013.01); *B29L 2031/7129* (2013.01); *B32B 2250/03* (2013.01); *B32B 2250/246* (2013.01); *B32B 2264/108* (2013.01); *B32B 2272/00* (2013.01); *B32B 2307/4026* (2013.01); *B32B 2307/7163* (2013.01); *B32B 2307/732* (2013.01); *B32B 2307/744* (2013.01); *B32B 2307/758* (2013.01); *B32B 2439/06* (2013.01); *B65F 2250/1143* (2013.01); *C08J 2323/04* (2013.01); *C08J 2423/06* (2013.01); *C08L 2201/06* (2013.01); *C08L 2207/20* (2013.01)

(56) References Cited

U.S. PATENT DOCUMENTS

| | | | | |
|---|---|---|---|---|
| 2002/0141961 | A1* | 10/2002 | Falat | C08J 7/042 424/76.1 |
| 2004/0134923 | A1* | 7/2004 | Aquino | B65F 1/0006 99/467 |
| 2008/0236504 | A1* | 10/2008 | Silverman | A01K 1/0107 119/169 |
| 2010/0187135 | A1* | 7/2010 | Broering | B65F 1/0006 206/524.2 |
| 2011/0245057 | A1 | 10/2011 | Scoledes et al. | |
| 2015/0047571 | A1* | 2/2015 | Mast | A01K 1/0152 119/172 |
| 2016/0108217 | A1* | 4/2016 | Drummond | B29B 17/0412 241/24.28 |
| 2016/0279910 | A1* | 9/2016 | Kohlweyer | B32B 27/32 |
| 2018/0118415 | A1* | 5/2018 | Jean-Mary | B31B 70/8134 |
| 2019/0270069 | A1* | 9/2019 | Kibele | B32B 27/28 |
| 2022/0219890 | A1* | 7/2022 | Stiglic | C08J 5/18 |
| 2023/0322445 | A1* | 10/2023 | Yan | B31B 70/20 |

* cited by examiner

100

200

COMPOSITIONS AND MATERIALS FOR ODOR REDUCING ARTICLES INCLUDING TRASH BAGS

CROSS REFERENCE TO RELATED APPLICATIONS

The present application claims the benefit of priority to U.S. Provisional Patent Application No. 63/134,874, filed Jan. 7, 2021, the entirety of which is hereby incorporated by reference herein.

FIELD OF THE INVENTION

Disclosed herein are multilayer films for use in preparing articles of manufacture (including trash bags). In several embodiments, the multilayer films comprise odor absorbing agents that reduce the smell of trash within a trash bag comprising the film. Also disclosed herein are methods of using and making multilayer films and/or trash bags comprising the multilayer films. In several embodiments, the films and/or the trash bags comprising such films are biodegradable.

BACKGROUND

Description of the Related Art

Controlling odors from garbage (e.g., decaying foodstuff, etc.) placed in the trash bags (e.g., trash) is a significant concern. As a result, trash bags are often scented to help mask (e.g., hide) the odors that escape from (e.g., permeate through) the trash bags. The trash bags are typically "scented" by coating one or more sides (e.g., the interior or exterior sides) with a fragrance. Additionally (or alternatively), manufacturers use thicker sidewall trash bags to help prevent odors from escaping. Conventional understanding is that the mass of a film making the trash bag is directly proportional to the ability of the thermoplastic film to hold to malodor molecules yielding better odor control performance. Manufacturers typically must weigh odor control and manufacturing costs when developing products with thermoplastic films.

SUMMARY

Several embodiments disclosed herein pertain to multilayer films and/or articles of manufacture comprising such films (e.g., trash bags). In several embodiments, the film is configured to control odors of the contents held in an article comprising the film. In several embodiments, the article is a trash bag. In several embodiments, the trash bag reduces the amount of odor emitted from it when compared to other trash bags. In several embodiments, a trash can that includes the trash bag has perceptibly reduced amount of odor associated with it when compared to the same trash can including other trash bags. In several embodiments, the film and/or the article comprising the film (e.g., a trash bag) is configured to biodegrade (e.g., in the environment under normal conditions).

Several embodiments pertain to a trash bag comprising the multilayer film. In several embodiments, the trash bag comprises a multilayer sidewall (e.g., a sidewall comprising, consisting of, or consisting essentially of the film). In several embodiments, the sidewall defines an inner and outer surface of the trash bag. In several embodiments, the multilayer sidewall has a thickness spanning from an outside surface to the inner surface (e.g., of the trash bag). In several embodiments, the multilayer sidewall comprises at least a first layer and a second layer. In several embodiments, the first layer comprises a biodegradable polymer. In several embodiments, the second layer comprises a biodegradable polymer. In several embodiments, the second layer comprises a biodegradable polymer and an odor control agent. In several embodiments, the second layer comprises a biodegradable polymer, an odor control agent, and a post-consumer recycled material (e.g., plastic). In several embodiments, the biodegradable polymer of the second layer is a post-consumer recycled plastic.

Any of the embodiments described above, or described elsewhere herein, can include one or more of the following features.

In several embodiments, the first layer provides the outside surface of the trash bag. In several embodiments, the second layer is located more proximally to the inside surface of the trash bag than the first layer. In several embodiments, the first layer and the second layer are bonded to each other. In several embodiments, the first layer and the second layer are bonded to each other over a majority of the first layer and the second layer (e.g., over a majority of the interfacial surface between the first and second layers). For example, in several embodiments, the first layer and the second layer are bonded to each other over a majority of a surface area of the first layer and/or the second layer.

In several embodiments, the trash bag further comprises a third layer. In several embodiments, the third layer provides the inner surface of the bag. In several embodiments, the third layer comprises a biodegradable polymer.

In several embodiments, the second layer and the third layer are bonded to each other. In several embodiments, the first layer and the second layer are bonded to each other over a majority of the first layer and the second layer (e.g., over a majority of the interfacial surfaces of the first and second layers). In several embodiments, the second layer and the third layer are bonded to each other over a majority of a surface area of the second layer and the third layer.

In several embodiments, the first layer comprises, consists of, or consists essentially of a bioplastic. In several embodiments, the bioplastic comprises, consists of, or consists essentially of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing. In several embodiments, the biodegradable polymer of the first layer comprises, consists of, or consists a polymer derived from sugar cane. In several embodiments, the biodegradable polymer of the first layer comprises, consists of, or consists essentially of a cellulose. In several embodiments, the biodegradable polymer of the first layer comprises, consists of, or consists essentially of a polyethylene copolymer. In several embodiments, the biodegradable polymer of the first layer comprises, consists of, or consists essentially of polyethylene copolymer 1-butene, 1-hexene.

In several embodiments, the third layer (where present) comprises, consists of, or consists essentially of a bioplastic. In several embodiments, the bioplastic of the third layer comprises, consists of, or consists essentially of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing. In several embodiments, the biodegradable polymer of the third layer comprises, consists of, or consists essentially of a cellulose. In several embodiments, the biodegradable polymer of the third layer comprises, consists of, or consists a polymer derived from sugar cane. In several embodiments, the biodegradable polymer of the third layer comprises, consists of, or consists essentially of a polyethylene copolymer. In several embodiments, the biodegradable polymer of the third layer comprises, consists of, or consists essentially of polyethylene copolymer 1-butene, 1-hexene.

In several embodiments, the first layer and/or the third layer comprise, consist of, or consist essentially of same composition (e.g., the same material). In several embodiments, the first layer and/or the third layer comprises, consists of, or consists essentially of a polyethylene copolymer. In several embodiments, the first layer and/or the third layer comprises, consists of, or consists essentially of polyethylene copolymer 1-butene, 1-hexene.

In several embodiments, the second layer comprises a bioplastic. In several embodiments, the bioplastic of the second layer comprises, consists of, or consists essentially of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing. In several embodiments, the biodegradable polymer of the second layer comprises, consists of, or consists essentially of a cellulose. In several embodiments, the biodegradable polymer of the second layer comprises, consists of, or consists a polymer derived from sugar cane. In several embodiments, the biodegradable polymer of the second layer comprises, consists of, or consists essentially of a polyethylene copolymer. In several embodiments, the biodegradable polymer is derived from and/or is a post-consumer recycled plastic. In several embodiments, the second layer may comprise a material that is the same or different from a material of the first layer (and/or the third layer, where present).

In several embodiments, the second layer comprises a cellulose. In several embodiments, the second layer comprises a polymer derived from sugar cane. In several embodiments, the second layer comprises a polyethylene copolymer. In several embodiments, the second layer comprises a green polyethylene copolymer. In several embodiments, the second layer comprises a polyethylene copolymer 1-butene, 1-hexene.

In several embodiments, the second layer comprises the biodegradable polymer at a weight percent of equal to or at least about 49%.

In several embodiments, the odor control agent is an odor absorbing agent. In several embodiments, the odor control agent comprises, consists of, or consists essentially of charcoal.

In several embodiments, the second layer comprises the odor control agent at a weight percent of equal to or at least 1%. For example, in several embodiments, the second layer comprises a substrate in which the odor control agent resides.

In several embodiments, the second layer comprises a post-consumer recycled material (PCR). In several embodiments, the PCR is provided in addition to the biodegradable polymer. For example, in several embodiments, the biodegradable polymer provides a substrate (or at least a portion of a substrate) in which the PCR resides. In other embodiments, the PCR is the substrate. In several embodiments, the PCR comprises, consists of, or consists essentially of recycled plastic.

In several embodiments, the second layer comprises PCR at a weight percent of equal to or at least about 50%.

In several embodiments, the second layer has a thickness that is equal to or greater than the thickness of the first layer. In several embodiments, the second layer has a thickness that is equal to or greater than the thickness of the third layer. In several embodiments, the second layer has a thickness that is equal to or greater than the cumulative thickness of the first layer and the third layer.

In several embodiments, at least a portion of the trash bag is configured to degrade in an outside environment (e.g., to biodegrade) and/or simulated environmental conditions (e.g., such as simulated landfill conditions). In several embodiments, a minimum of 70% of the trash bag biodegrades under anaerobic conditions within 30 days as determined in accordance with test procedure ASTM D5511-18. In several embodiments, a minimum of 70% of the trash bag biodegrades under anaerobic conditions within the duration of the ASTM D5526-18 testing procedure.

Several embodiments disclosed herein pertain to a multilayer film. In several embodiments, the multilayer film comprises at least a first layer and a second layer, as disclosed elsewhere herein. In several embodiments, the first layer comprises a biodegradable polymer. In several embodiments, the second layer comprises a biodegradable polymer and an odor absorbing agent. In several embodiments, the biodegradable polymer of the second layer provides a substrate for the odor absorbing agent. In several embodiments, the second layer has a thickness that is greater than the thickness of the first layer. In several embodiments, the multilayer film comprises a third layer, as disclosed elsewhere herein.

Several embodiments disclosed herein pertain to a trash bag. In several embodiments, the trash bag comprises a multilayer sidewall defining an inner surface of the trash bag. In several embodiments, the multilayer sidewall has a thickness spanning from an outside surface of the trash bag to an inner surface of the trash bag. In several embodiments, the multilayer sidewall comprises at least a first layer, second layer, and third layer. In several embodiments, the first layer and third layer comprise a biodegradable polymer. In several embodiments, the second layer comprises a biodegradable polymer and an odor absorbing agent. In several embodiments, the first layer provides the outside surface of the bag and the third layer provides the inner surface of the bag. In several embodiments, the second layer is bonded between the first layer and third layer (e.g., bonded to each of the first and second layer, such as, one side of the second layer is bonded to a side of the first layer and a second side of the second layer is bonded to the third layer). In several embodiments, the second layer has a thickness that is greater than the thickness of the combined thickness of the first layer and third layer.

Several embodiments disclosed herein pertain to a method of manufacturing the film or the trash bag. In several embodiments, the method includes coextruding different polymer compositions to provide a multilayer film. In several embodiments, the method includes extruding a first polymer composition (for a first layer), a second polymer composition (for a second layer), and a third polymer composition (for a third layer) together to form a three-layer film as disclosed elsewhere herein. In several embodiments, the first and third compositions comprise the same components and substantially the same components. In several embodiments, the second composition comprises an odor absorbing agent and PCR.

Several embodiments disclosed herein pertain to a method of manufacturing a trash bag. In several embodiments, the method includes coextruding a multilayer film as disclosed elsewhere herein. In several embodiments, the method includes preparing a multilayer film comprising at least a first layer and a second layer. In several embodiments, the method includes the preparing a first layer comprising a biodegradable polymer. In several embodiments, the method includes preparing a second layer comprising a biodegradable polymer and an odor absorbing agent. In several embodiments, the first layer provides the outside surface of the bag. In several embodiments, the second layer is located more proximally to the inside surface of the trash bag than the first layer and/or the second layer provides the inner surface of the trash bag.

Any of the embodiments described above, or described elsewhere herein, can include one or more of the following features.

In several embodiments, the method includes transferring a polymer composition (e.g., comprising a biodegradable polymer, an odor absorbing agent, PCR, combinations thereof) into an extruding apparatus. In several embodiments, the extruding apparatus includes a die, or the extruding apparatus is fluidly connected to the die. In several embodiments, the method includes processing (e.g., heating, mixing, etc.) the polymer composition (e.g., comprising a biodegradable polymer, an odor absorbing agent, PCR, combinations thereof) to form an extrudate. In several embodiments, the method includes exposing the polymer composition (or compositions as disclosed elsewhere herein) to elevated temperature, elevated pressure, or a combination of any of the forgoing. In several embodiments, the extruding apparatus and/or the die are configured to produce and extrudate in the shape of the die (e.g., a ring, sheet, etc.).

In several embodiments, the method includes using a die to form the extrudate into a ring. In several embodiments, the method includes injecting the ring with a gas (e.g., air). In several embodiments, the gas is pressurized. In several embodiments, the ring is injected with pressurized gas to form a first bubble. In several embodiments, the method includes compressing the first bubble to form a flat tube. In several embodiments, the tube is cut and shaped. In several embodiments, one end of the tub is heat sealed to provide a bag. In several embodiments, a seam is formed to accommodate a drawstring and/or a draw tape. In several embodiments, a draw tape is provided along the tube and a lip of the tube is folded over the draw tape and sealed to hold the draw tape.

In several embodiments, the method includes removing the flat tube from the die. In several embodiments, the method includes dividing the flat tube into a plurality of webs. In several embodiments, the method includes injecting each web of the plurality of webs with gas (e.g., air) to form a plurality of second bubbles. In several embodiments, the method includes cutting each second bubble of the plurality of second bubbles to form a plurality of trash bags. In several embodiments, the method includes sealing each trash bag of the plurality of trash bags.

In several embodiments, the method includes a die forming the extrudate into a first sheet. In several embodiments, the method includes folding and heat sealing the first sheet on a first and second side to provide a plurality of trash bags.

In several embodiments, the method includes separating each trash bag from the plurality of trash bags. In several embodiments, each trash bag is folded, stacked and/or inserted into packaging.

DETAILED DESCRIPTION

Figure 1A:
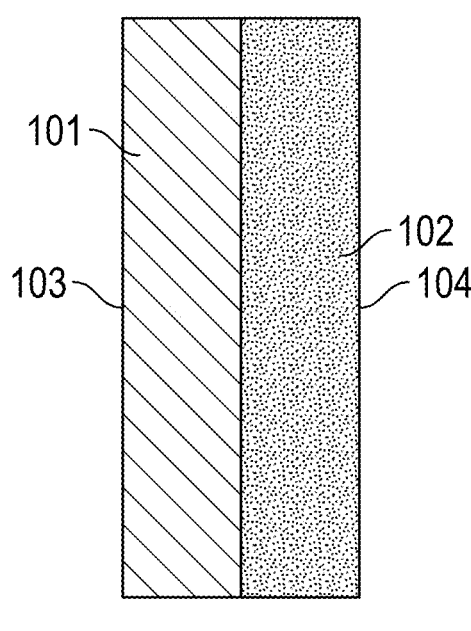
FIG. 1A depicts an embodiment of a multilayer film having two layers.

Some embodiments disclosed herein pertain to films which may be used to prepare bags (e.g., trash bags), methods of making such films (or articles), and methods of using such films. In several embodiments, the films comprise at least one odor absorbing layer. In several embodiments, the odor absorbing layer reduces the smell of trash or refuse contained within an article (e.g., a bag, trash bag, or other container) comprising the film. For example, in several embodiments, when compared to a trash bag not comprising an odor absorbing layer, the trash bag having the odor absorbing layer provides reduces the smell of the trash. In several embodiments, the film comprises, consists of, or consists essentially of environmentally friendly and/or environmentally sustainable materials. In several embodiments, the odor absorbing layer comprises post-consumer recycled material (PCR) and an odor absorbing agent. In several embodiments, the odor absorbing agent is carbon (e.g., an activated carbon). A variety of films are described below to illustrate various examples that may be employed to achieve one or more desired improvements. These examples are only illustrative and not intended in any way to restrict the general inventions presented and the various aspects and features of these inventions. Furthermore, the phraseology and terminology used herein is for the purpose of description and should not be regarded as limiting. No features, structure, or step disclosed herein is essential or indispensable. Any feature, structure, component, material, step, or method that is described and/or illustrated in any embodiment in this specification can be used with or instead of any feature, structure, component, material, step, or method that is described and/or illustrated in any other embodiment in this specification. Additionally, any feature, structure, component, material, step, or method that is described and/or illustrated in one embodiment may be absent from another embodiment.

As used herein, the term "post-consumer recycled material" is given its plain and ordinary meaning and includes those materials (e.g., a plastic, paper, etc.) generated after an original product comprising those materials (e.g., a soda bottle, container, newspaper) has reached the end of its use by a consumer (e.g., has been thrown away or recycled). Those used products are diverted from the landfill and utilized in the production of post-consumer recycled material.

As used herein, the term "weight percent," when referring to a component, is the weight of the component divided by the weight of the composition that includes the component, multiplied by 100%. For example, the weight percent of component A when 5 grams of component A is added to 95 grams of component B is 5% (e.g., 5 g A/(5 g A+95 g B)×100%).

As used herein, when the term "collectively or individually" (and variations thereof) modifies an amount of a component or components (e.g., a weight percent) of multiple component composition, this usage means that each individual component may be provided in the amount disclosed or that combined amount of components may be provided in the amount disclosed. For example, if agents A and B are referred to as, collectively or individually, being present in a composition at a wt % of 5%, that means that A may be at 5 wt % in the composition (individually), B may be at 5 wt % in the composition (individually), or the combination of A and B may be present at a total of 5 wt % (A+B=5 wt %, e.g., collectively). Where A is present at 5 wt %, B may be absent. Where B is present at 5 wt %, A may be absent. Alternatively, where both A and B are present, A may be at 5 wt % (individually) and B may be at 5 wt % (individually), totaling 10 wt % (collectively).

When referring to various features, the terms "or ranges including and/or spanning the aforementioned values" may be used. These terms (and variations thereof) are meant to include any range that includes or spans any of the aforementioned values. For example, with regard to the concentration for an ingredient, the wt % of that ingredient may be expressed as "equal to or at least about: 1%, 5%, 10%, 20%, or ranges including and/or spanning the aforementioned values." This language includes not only the particular wt % provided and the range exceeding that value (e.g., equal to or at least about 1%, equal to or at least about 5%, equal to or at least about 10%, and equal to or at least about 20%) but also the wt % ranges for the ingredient spanning those values (e.g., from 1% to 20%, 1% to 10%, 1% to 5%, 5% to 20%, 5% to 10%, and 10% to 20%). Similarly, with regard to the concentration for an ingredient, the wt % of that ingredient may be expressed as "equal to or less than about: 1%, 5%, 10%, 20%, or ranges including and/or spanning the aforementioned values." This language includes not only the particular wt % provided and the range below that value (e.g., equal to or less than about 1%, equal to or less than about 5%, equal to or less than about 10%, and equal to or less than about 20%) but also the wt % ranges for the ingredient spanning those values (e.g., from 1% to 20%, 1% to 10%, 1% to 5%, 5% to 20%, 5% to 10%, and 10% to 20%).

As used herein, the terms "odor control component" or "odor control agent" (or the like) refer to a composition that effects (e.g., absorbs, changes, and/or masks) odors in at least one manner. For example, the "odor control component" may absorb malodorants (e.g., foul smell odors) and/or may release fragrance materials. Furthermore, the "odor control component" may mask (e.g., cover up) and/or neutralize malodorants. As used herein the term "neutralize" or any of its derivative terms refers to an ability of a compound or product to reduce or eliminate malodorous compounds. Odor neutralization may be partial, affecting only some of the malodorous compounds in a given context, or affecting only a portion of a malodorous compound. A malodorous compound may be neutralized by chemical reaction resulting in a new chemical entity, by sequestration, by chelation, by association, or by any other interaction rendering the malodorous compound less malodourous or non-malodorous.

As used herein, the term "odor" refers to any substance that can stimulate an olfactory response in a human (e.g., sense of smell).

As used herein the term "malodor" and any of its derivative terms refers to an odor that is generally considered unpleasant, obnoxious, or nauseating by the general population, such as the broad spectrum of odors associated with household trash, including odors related to stale urine, feces, vomitus, and putrefying organic materials (e.g., decomposing food waste), in common household trash.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "includes" should be interpreted as "includes but is not limited to;" the term "example" is used to provide exemplary instances of the item in discussion, not an exhaustive or limiting list thereof; and use of terms like "preferably," "preferred," "desired," or "desirable," and words of similar meaning should not be understood as implying that certain features are critical, essential, or even important to the structure or function of the invention, but instead as merely intended to highlight alternative or additional features that may or may not be utilized in a particular embodiment of the invention. In addition, the term "comprising" is to be interpreted synonymously with the phrases "having at least" or "including at least". When used in the context of a process, the term "comprising" means that the process includes at least the recited steps, but may include additional steps. When used in the context of a compound, composition or device, the term "comprising" means that the compound, composition or device includes at least the recited features or components, but may also include additional features or components. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Additionally, the phrase "consisting essentially of" will be understood to include those elements specifically recited and those additional elements that do not materially affect the basic and novel characteristics of the claimed technology. The phrase "consisting of" excludes any element not specified.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

Introduction

There are a number of considerations to be made in films and controlling odors with thermoplastic films (especially trash bags). For instance, one way to prevent odors from emanating from trash bags is to make the trash bags thicker. However, thicker trash bags use more materials (including nondegradable polymer materials) that generate additional waste (being less environmentally friendly) and expense during manufacturing. Alternatively, thinner materials lead to less smell control and decreased strength (leading to additional waste). Disclosed herein are polymer-based films and articles, such as trash bags, made therefrom that solve one or more of these problems or others. In several embodiments, a trash bag as disclosed herein provides sufficient strength and odor control with a lower environmental and/or economic load. In several embodiments, the film comprises one or more biodegradable polymers. In several embodiments, the film comprises post-consumer recycled material (PCR). In several embodiments, the film (e.g., a layer of the film) comprises an odor absorbing agent. In several embodiments, an article comprising a film as disclosed herein or the film itself is fully, substantially, or partially biodegradable.

Multilayer Films and Articles of Manufacture Made Therefrom

As disclosed elsewhere herein, several embodiments, pertain to multilayer films (and/or articles of manufacture comprising a multilayer film). In several embodiments, the film and/or each layer of the polymer film comprises one or more polymers. In several embodiments, the polymer may be a thermoplastic polymer. As disclosed elsewhere herein, sheets of these multilayer films may be processed (e.g., shaped and heat sealed) to provide articles of manufacture, such as trash bags or other film articles where odor control is needed or desired. In several embodiments, different compositions (e.g., different polymer resins with different components) are blended (e.g., melted together) to prepare a given layer. In several embodiments, the layers (e.g., layers comprising different compositions) of the multilayer film are coextruded, thereby providing the multilayer film. In several embodiments, coextrusion bonds the layers together.

In several embodiments, the layers are bonded along a majority of the surface of each extruded layers (e.g., a majority, substantially entirety, or entirety of an interface between layers). For example, the layers may be bonded (e.g., adhered) to one another over their entire interfacial surface or substantially their entire interfacial surface. In several embodiments, adjacent layers of the film are bonded over a percent of one of the layer's surface area that is equal to or at least about: 50%, 60%, 70%, 80%, 90%, 95%, 99%, 100%, or ranges including and/or spanning the aforementioned values. For example, the first and second layers may be bonded to one another (e.g., adhered to one another) on over 90% of the surface area of the first layer. Similarly, the first and second layers may be bonded to one another (e.g., adhered to one another) on over 90% of the surface area of the second layer. Where a third layer is present, the second any third layer may be bonded to one another (e.g., adhered to one another) on over 90% of the surface area of the third layer.

In several embodiments, different layers may serve different purposes within the film. For example, one or more layers of the film may provide desirable bulk material properties to an article comprising the film (such as resilience, which may include strength, puncture resistance, etc.). Other layers may be responsible primarily for odor control. For example, a first layer of the film may serve primarily to provide the article with sufficient strength and/or puncture resistance such that the article (e.g., trash bag) can be used to carry trash (e.g., boxes, bottles, broken glass, food waste, etc.). These layers may imbue the article with resilience (e.g., against breakage from puncture or tearing under weight of gravity, etc.) and are referred to from time-to-time as resilient layers. Alternatively, a separate layer, referred to herein from time-to-time as an odor control layer, may be used primarily to provide odor control properties to the article. For example, this layer may comprise an odor absorbing agent. In several embodiments, the layer comprising the odor absorbing agent also includes polymer material (e.g., one or more polymer materials). In several embodiments, the polymer material in the odor control layer may be configured to give the odor control layer desirable material properties (e.g., supporting the odor control agent and/or, at the same time, allowing bonding with other layers of the film, etc.). In several embodiments, the odor control layer also confirms some level of resilience to the bag (though the layer itself may not be used primarily to provide resilience and may not be referred to specifically herein as a resilient layer herein). In several embodiments, as disclosed elsewhere herein, the odor control layer may be sandwiched between two resilient layers (e.g., layers that serve primarily to provide the article with strength and/or puncture resistance).

In several embodiments, the multilayer film comprises two, three, four, or more layers. For example, as shown in FIG. 1A, in several embodiments, the multilayer film 100 may comprise a first layer 101 and a second layer 102. The first layer may provide a first side 103 of the film 100 and the second layer 102 may provide a second side 104 of the film 100. In the film of FIG. 1A, the first layer is a resilient layer and the second layer is an odor absorbing layer (e.g., an odor control layer). In other embodiments, as shown in, for example, FIG. 1B, the multilayer film 200 may comprise a first layer 201, a second layer 202, and a third layer 203 (e.g., where the second layer 202 is between the first layer 201 and the third layer 203). As shown, the first layer and third layers are resilient layers and, in this example, the second layer is an odor absorbing layer (e.g., an odor control layer). In still other embodiments, the multilayer film may comprise a first layer, a second layer, a third layer, and a fourth layer, and so on, where each layer may be resilient or odor absorbing (e.g., in alternating fashion or otherwise arranged). The first layer 201 may provide a first side 204 of the film 200 and the third layer 203 may provide a second side 205 of the film 200.

Figure 1B:
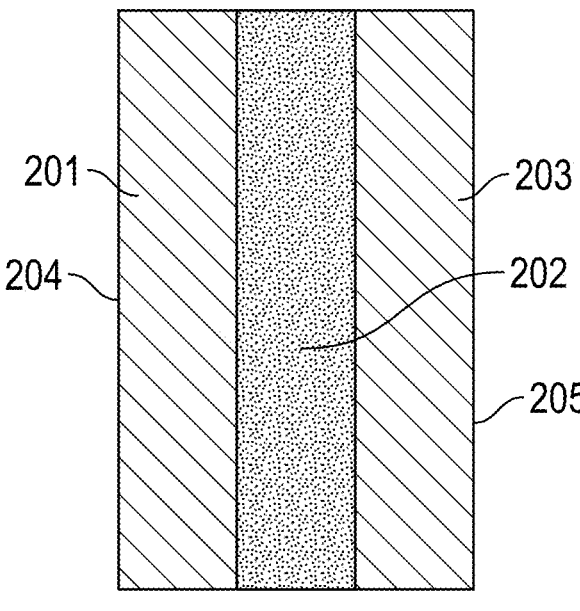
FIG. 1B depicts an embodiment of a multilayer film having three layers with an odor absorbing layer disposed between two resilient polymer layers.

In several embodiments, each layer (e.g., the first, second, third, etc.) comprises a bulk polymer. In several embodiments, the bulk polymer provides, is primarily responsible for, and/or is added to provide and/or improve bulk properties of the layer (e.g., the strength, yield strength, toughness, brittleness, melt temperature, melt viscosity, modulus, tensile strength, etc.). In several embodiments, the bulk polymer provides a substrate for other constituents of the layer. In several embodiments, the bulk polymer may be the major constituent of a layer. For example, the bulk polymer may make up a majority of the weight of a layer and/or the bulk polymer may account for more weight in a particularly layer than any other ingredient that may be present in that layer. In several embodiments, the bulk polymer is the major constituent of a resilient layer. In several embodiments, for example, a resilient layer comprises the bulk polymer at a weight percent of equal to or at least about: 70%, 80%, 85%, 90%, 95%, 97.5%, 98%, 98.5%, 99%, or ranges including and/or spanning the aforementioned values. For example, in several embodiments, the first layer (as shown in FIG. 1A) or the first and third layers (as shown in FIG. 1B) may comprise the bulk polymer at a weight percent of ranging between about 70% and about 99%, between about 80% and 99%, between about 90% and 98.5%, etc.

In several embodiments, the bulk polymer may also be the major constituent of the odor absorbing layer. In other embodiments, the bulk polymer is not the major constituent of the odor absorbing layer. In several embodiments, an odor absorbing layer comprises the bulk polymer at a weight percent of equal to or at least about: 5%, 7.5%, 10%, 12%, 15%, 20%, 35%, 40%, 45%, 47.5%, 49%, 50%, 55%, 60%, 70%, 80%, 85%, 90%, 95%, or ranges including and/or spanning the aforementioned values. For example, in several embodiments, the second layer (as shown in FIG. 1A or FIG. 1B) may comprise the bulk polymer at a weight percent of ranging between about 5% and about 12%, between about 7.5% and about 15%, between about 40% and about 55%, between about 45% and 50%, between about 35% and 55%, etc.

As will be appreciated in view of the disclosure herein, in several embodiments, different layers (e.g., the first layer, the second layer, and the third layer) may comprise the same or different bulk polymers (or other layer constituents). For example, in a two layer configuration, the first layer may have one bulk polymer and the second layer may have a second different bulk polymer. In another two layer configuration, the first layer may have one bulk polymer and the second layer may have that same bulk polymer. In several embodiments, in a three layer configuration, the first and third layer may have the same bulk polymer and the second layer may have a different bulk polymer. Alternatively, in a three layer configuration, the first and third layer may have the same bulk polymer as the second layer. In yet another alternative, in a three layer configuration, the first and second layer may have the same bulk polymer and the third layer may have a different bulk polymer. In still another alternative, in a three layer configuration, the second and third layer may have the same bulk polymer and the first layer may have a different bulk polymer. In another alternative, in a three layer configuration, the first, second, and third layer may each have a different bulk polymer. In another alternative, in a three layer configuration, the first, second, and third layer may have the same bulk polymer. In several embodiments, where layers have the same constituents, the relative ratios of those constituents may be different to provide different properties in different layers. In several embodiments, where layers have the same constituents, the relative ratios of those constituents may be the same to provide similar properties in different layers. Other configurations are possible.

In several embodiments, instead of a single bulk polymer, a layer may comprise a mixture of one or more bulk polymers (e.g., one, two, three, four, or more polymers and/or biodegradable polymers). In several embodiments, the mixture of polymers are polymers that do not phase separate when combined. In several embodiments, where a mixture of polymers (e.g., more than one bulk polymer, a bulk polymer and a filler polymer, etc.) is used in a given layer, the polymers may each be present at a weight percent, collectively or individually, of equal to or at least about: 5%, 7.5%, 10%, 12%, 15%, 35%, 40%, 45%, 50%, 55%, 60%, 70%, 80%, 85%, 90%, 95%, or ranges including and/or spanning the aforementioned values. For example, in several embodiments, the polymers may be present at a weight percent, collectively or individually, ranging from about 5% to about 12%, from about 7.5% to about 15%, from about 15% to about 80%, from about 15% to about 70%, from about 35% to about 70%, from about 40% to about 95%, etc.

In several embodiments, a bulk polymer (or bulk polymers) of any given layer may be a biodegradable polymer. In several embodiments, the bulk polymer is a bioplastic. In several embodiments, the bulk polymer comprises, consists of, or consists essentially of a bioplastic. In several embodiments, the bioplastic (which may be a bulk polymer) comprises, consists of, or consists essentially of a polyhydroxyalkanoate (PHA), a polylactic acid (PLA), a degradable polyethylene (e.g., green polyethylene), a starch blend, a polysaccharide material, a petroleum-based plastic, a polyglycolic acid, a polybutylene succinate, a polycaprolactone, polyvinyl alcohol, polybutylene adipate terephthalate, a sugar cane-derived polymer, or a combination of any of the foregoing. In several embodiments, the bioplastic (which may be a bulk polymer) comprises, consists of, or consists essentially of a cellulose. In several embodiments, the bioplastic (which may be a bulk polymer) comprises, consists of, or consists essentially of a polymer derived from sugar cane. In several embodiments, the bioplastic (which may be a bulk polymer) comprises, consists of, or consists essentially of a polyethylene (or polyethylene copolymer). In several embodiments, the bioplastic (which may be a bulk polymer) comprises, consists of, or consists essentially of polyethylene copolymer 1-butene, 1-hexene. In several embodiments, the bulk polymer comprises, consists of, or consists essentially of a PCR polymer (e.g., plastic).

In several embodiments, a layer comprises a polymer composition. The polymer composition comprises the bulk polymer components present in a given layer. In several embodiments, the polymer composition of a layer further comprises other components such as additives. In several embodiments, the additives may include one or more plasticizers, one or more lubricants, one or more stabilizers, dyes, slip agents (slip), anti-blocking agents (AB), desiccants, or combinations of the foregoing. In several embodiments, these additives may confer desired material and/or processing properties to the polymer composition. In several embodiments, a polymer layer comprises one or more additives at a weight percent, collectively or individually, of equal to or at least about: 0.5%, 1.0%, 2.5%, 3.0%, 4.0%, 5.0%, 6.0%, or ranges including and/or spanning the aforementioned values. For example, in several embodiments, an additive (e.g., a slip agent) is present in a polymer layer at a weight percent ranging from about 0.5% to about 6%, from about 1.0% to about 3.0%, from about 0.5% to about 4.0%, etc. That same layer may also comprise a different additive (e.g., an AB) at a weight percent ranging from about 0.5% to about 6%, from about 1.0% to about 3.0%, from about 0.5% to about 4.0%, etc. Alternative, collectively, the slip agent and AB may be provided in the layer at a weight percent ranging from about 0.5% to about 6%, from about 1.0% to about 3.0%, from about 0.5% to about 4.0%, etc. In some embodiments, the additives are biodegradable and/or environmentally friendly. In several embodiments, a layer lacks one or more plasticizers, one or more lubricants, one or more stabilizers, dyes, slip agents (slip), anti-blocking agents (AB), desiccants, or combinations of the foregoing.

As shown in FIG. 1B, the polymer film may comprise more than one resilient layer 201, 201. In several embodiments, where more than one resilient layer is present, the resilient layers may comprise, consist of, or consist essentially of the same composition (e.g., bulk polymer, additives, etc.). For example, the first and third layer of the embodiment of FIG. 1B are the same or substantially the same. In several embodiments, for example, the first and third layer of the embodiment of FIG. 1B comprise the same bulk polymer. In several embodiments, alternatively, the first and third layer may comprise the same bulk polymer but different additives. For example, the outside surface of a trash bag may comprise a dye and the inside surface may not. In still other embodiments, the bulk polymers or other constituents within resilient polymer layers may be different. Similarly, though not shown, when more than one odor absorbing layer is present, the odor absorbing layers may comprise, consist of, or consist essentially of the same composition (e.g., bulk polymer, odor absorbing agent(s), additives, etc.) or different compositions.

In several embodiments, as disclosed elsewhere herein, the odor absorbing layer comprises an odor control agent (e.g., an odor absorbing agent). In several embodiments, the odor control agent may include one or more of desiccant materials (e.g., a hygroscopic substance, such as calcium oxide or silica gel, that has a high affinity for water and is used as a drying agent), antimicrobial agents (e.g., zinc pyrithione and/or copper pyrithione), deodorizing agents, and functional nanoparticles. In several embodiments, the odor control agent may include an absorbent agent. In several embodiments, the odor control agent is charcoal (e.g., activated charcoal). In several embodiments, activated charcoal acts as an odor absorber. In several embodiments, an odor absorbing polymer layer comprises one or more odor absorbing agents at a weight percent, collectively or individually, of equal to or less than about: 0.25%, 0.5%, 1.0%, 2.5%, 4%, 5%, 6%, 7%, 10%, or ranges including and/or spanning the aforementioned values. For example, in several embodiments, an odor absorbing agent (or agents) is present in an odor absorbing polymer layer at a weight percent ranging from about 0.5% to about 6%, from about 0.25% to about 10%, from about 1.0% to about 4.0%, etc. For further illustration, in several embodiments, charcoal is present in an odor absorbing polymer layer at a weight percent ranging from about 0.5% to about 6%, from about 0.25% to about 10%, from about 1.0% to about 4.0%, etc.

In several embodiments, the odor absorbing layer also comprises an amount of post-consumer recycled material (PCR). In several embodiments, the PCR is the bulk polymer and/or bulk material (while in other embodiments it is not). In several embodiments, the PCR advantageously enhances the odor absorbing ability of the odor absorbing agent. Without being bound to a particular theory, the PCR may provide a pathway for odors to reach the odor absorbing agent (e.g., through diffusion), thereby facilitating odor reduction. In several embodiments, the PCR also reduces the amount of bulk polymer needed. In several embodiments, the PCR facilitates break down and degradation of an article comprising the polymer film. In several embodiments, the PCR comprises, consists of, or consists essentially of recycled paper, recycled plastic, and/or combinations of the foregoing. In several embodiments, the PCR comprises, consists of, or consists essentially of low density polyethylene (e.g., Low Density Polyethylene Green). In several embodiments, an odor absorbing polymer layer comprises PCR at a weight percent of equal to or at least about: 15%, 35%, 40%, 45%, 50%, 55%, 60%, 70%, 80%, 85%, 86%, 87%, 88%, 90%, 95%, or ranges including and/or spanning the aforementioned values. For example, in several embodiments, the PCR is present in an odor absorbing polymer layer at a weight percent ranging from about 60% to about 95%, from about 70% to about 95%, from about 50% to about 95%, from about 70% to about 90%, etc.

In several embodiments, an odor absorbing layer (or layers) makes up a majority of the thickness of the multilayer polymer film. In several embodiments, an odor absorbing layer is thicker than a resilient polymer layer. In several embodiments, the ratio of an odor absorbing layer to a resilient layer may be equal to or greater than about: 10:1, 8:1, 7:1, 6:1, 5:1, 4:1, 3:1, 2:1, 3:2, 5:2, 4:3, and/or ratios spanning the aforementioned values. In several embodiments, the ratio of an odor absorbing layer to resilient layers of the multilayer film (e.g., the resilient layers collectively) may be equal to or greater than about: 6:1, 5:1, 4:1, 3:1, 2:1, 3:2, 5:2, 4:3, and/or ratios spanning the aforementioned values. For example, the ratio of an odor absorbing layer to a resilient layer may be between 10:1 and 2:1, between 2.1 and 4:3, between 3:1 and 4:3, etc.

In several embodiments, the polymer film is pliable and readily conforms to a desired shape (e.g., to fit into a trash can). In several embodiments, the pliability and desirable physical properties are due in part to the film being relatively thin. In several embodiments, the multilayer film has a thickness (e.g., a combined thickness of the layers) of less than or equal to about: 2 mm, 1.5 mm, 1.4 mm, 1.3 mm, 1.2 mm, 1.1 mm, 1.0 mm, 0.5 mm, 0.25 mm, or ranges including and/or spanning the aforementioned values. In several embodiments, a resilient layer (or layers, e.g., the first and third layer) of the multilayer film has a thickness of less than or equal to about: 1.0 mm, 0.75 mm, 0.50 mm, 0.40 mm, 0.30 mm, 0.25 mm, 0.20 mm, 0.15 mm, 0.10 mm, or ranges including and/or spanning the aforementioned values. For example, a resilient layer of the multilayer film may have a thickness ranging from about 1.0 mm to about 0.10 mm, from about 0.75 mm to about 0.25 mm, from about 0.40 mm to about 0.15 mm, etc. In several embodiments, the odor absorbing layer of the multilayer film has a thickness of less than or equal to about: 1.0 mm, 0.90 mm, 0.80 mm, 0.75 mm, 0.70 mm, 0.65 mm, 0.50 mm, 0.40 mm, 0.30 mm, 0.25 mm, 0.20 mm, 0.15 mm, 0.10 mm, or ranges including and/or spanning the aforementioned values. For example, the odor absorbing layer of the multilayer film may have a thickness ranging from about 1.0 mm to about 0.10 mm, from about 0.75 mm to about 0.15 mm, from about 0.80 mm to about 0.65 mm, etc.

In several embodiments, a resilient layer (or layers, e.g., the first and third layer) of the multilayer film has a thickness of less than or equal to about: 100 μm, 50 μm, 40 μm, 30 μm, 20 μm, 10 μm, 7 μm, 5 μm, or ranges including and/or spanning the aforementioned values. For example, a resilient layer of the multilayer film may have a thickness ranging from about 100 μm to about 10 μm, from about 10 μm to about 5 μm, from about 40 μm to about 5 μm, etc. In several embodiments, the odor absorbing layer of the multilayer film has a thickness of less than or equal to about: 500 μm, 200 μm, 100 μm, 50 μm, 40 μm, 30 μm, 21 μm, 20 μm, 10 μm, 5 μm, or ranges including and/or spanning the aforementioned values. For example, the odor absorbing layer of the multilayer film may have a thickness ranging from about 500 μm to about 30 μm, from about 40 μm to about 10 μm, from about 100 μm to about 10 μm, etc. As an illustration of a three layer film, the first and third layer (e.g., resilient layers) may each have a thickness of 7 μm and the odor absorbing layer may have a thickness of 21 μm (for a total thickness of 35 μm; 7 μm+21 μm+7 μm).

In several embodiments, the multilayer film is puncture resistant. For example, when fabricated into an article (e.g., a trash bag), under standard puncture testing conditions, the film resists puncture. In several embodiments, the multilayer film has a puncture resistance of equal to or at least about: 5 Newtons (N), 7 N, 9 N, 11 N, 11 N, 12 N, 12.5 N, 12.9 N, 13.1 N, 13.4 N, 13.7 N, 14 N, 14.3 N, 14.6 N, 14.9 N, 15.2 N, 15.4 N, 15.7 N, 16 N, 20 N, 30 N, 50 N or ranges including and/or spanning the aforementioned values. For example, in several embodiments, the multilayer film has a puncture resistance ranging between about 7 N and about 50 N, between about 9 N and about 20 N, between about 11 N and about 16 N, etc. In several embodiments, puncture resistance may be measured in accordance with test method ASTM D-5748 or other standard measuring techniques. This ASTM D-5748 test method determines the resistance of a stretch wrap film to the penetration of a probe at a standard low rate, a single test velocity. Performed at standard conditions, the test method imparts a biaxial stress that is representative of the type of stress encountered in many product end-use applications. The maximum force, force at break, penetration distance, and energy to break are determined.

In several embodiments, the puncture resistance starting from a first side 103, 204 of the film (e.g., the outside of a trash bag comprising the film and traveling inward) is greater than the puncture resistance starting from a second side 104, 205 of the film (e.g., the inside of an article, such as a trash bag, comprising the film and traveling outward). Alternatively, in several embodiments, the puncture resistance starting from a first side 103, 204 of the film (e.g., the outside of a trash bag comprising the film and traveling inward) lower than the puncture resistance starting from a second side 104, 205 of the film (e.g., the inside of an article, such as a trash bag, comprising the film and traveling outward). In several embodiments, the puncture resistance from the first side and the second side are about the same. In several embodiments, the ratio of the puncture resistance starting from the first side versus starting from the second side of the film is equal to or at least about: 3:1, 2:1, 3:2, 4:3, 5:4, 6:5, 7:6, 8:7, 9:8, 1:1, 8:9, 7:8, 6:7, 5:6, 4:5, 3:2, 2:1, 3:1, ratios between the aforementioned ratios, or otherwise.

In several embodiments, the multilayer film absorbs odor and/or reduces odor. For example, when fabricated into a trash bag placed in a trash can, when the article contains a malodor emitting waste (e.g., food waste), the film resists and/or reduces the level of malodor emitted from the trash at a level greater than an article lacking an odor absorbing layer. Food waste decomposition odor can be measured using a scale with a smell magnitude from 0 (no smell) to 5 (offensive odor). In several embodiments, food waste in a trash bag comprising the odor absorbing layer reduce the smell magnitude (relative to a bag not comprising the odor reducing layer) by equal to or at least about: 0.25, 0.5, 0.6, 0.7, 0.8, 0.9, 1.0, 1.5, 2, or ranges including and/or spanning the aforementioned values. In several embodiments, food waste in a trash bag comprising the odor absorbing layer has a smell magnitude of equal to or at less than about: 0.5, 1, 1.5, 2, 2.5, 2.7, 2.8, 2.9, 3.0, 3.1, 3.2, 3.3, 3.4, 3.5, 3.6, or ranges including and/or spanning the aforementioned values. For example, in several embodiments, food waste in a trash bag comprising the odor absorbing layer has a smell magnitude ranging between about 0.5 and about 3.6, between about 1 and about 3.0, between about 2.5 and about 3.4, etc.

In several embodiments, the smell magnitude is measured a distance from the trash bag, such as equal to or at least about: 2.5 feet, 5 feet, 10 feet, 15 feet, or ranges including and/or spanning the aforementioned values. In several embodiments, the smell magnitude is measured in a closed room at any point in the room where the room has an area of equal to or less than about: 50 ft², 100 ft², 150 ft², 200 ft², or ranges including and/or spanning the aforementioned values.

In several embodiments, the multilayer films have a density sufficient to provide strength and to also allow odor absorption. In several embodiments, the multilayer films have a density of equal to or at least about: 0.85 g/cm³, 0.88 g/cm³, 0.9 g/cm³, 0.92 g/cm³, 0.94 g/cm³, 0.96 g/cm³, 0.98 g/cm³, or ranges including and/or spanning the aforementioned values. For example, in several embodiments, the multilayer films comprise a density ranging between about 0.85 g/cm³ to about 0.98 g/cm³, about 0.88 g/cm³ to about 0.96 g/cm³, etc. In several embodiments, the density is measured in accordance with test method ASTM D4883.

In several embodiments, the multilayer films comprise a tensile strength of equal to or greater than about: 5 megaPascals (MPa), 10 MPa, 20 MPa, 25 MPa, 30 MPa, 35 MPa, 40 MPa, 45 MPa, 50 MPa, 60 MPa, 70 MPa, 90 MPa, or ranges including and/or spanning the aforementioned values. For example, in several embodiments, the multilayer films comprise a tensile strength ranging between about 5 MPa and about 90 MPa, between about 10 MPa and about 70 MPa, between about 20 MPa and about 50 MPa, etc. In several embodiments, the tensile strength is measured in accordance with test method ASTM D-5748.

In several embodiments, the multilayer film (or sidewall of an article comprising the multilayer film) has a tensile elastic modulus of equal to or greater than about: 20 MPa, 50 MPa, 100 MPa, 150 MPa, 180 MPa, 190 MPa, 200 MPa, 210 MPa, 220 MPa, 250 MPa, 300 MPa, 500 MPa, or ranges including and/or spanning the aforementioned values. For example, in several embodiments, the multilayer films the tensile elastic modulus ranges between about 20 MPa and about 500 MPa, between about 50 MPa and about 300 MPa, between about 150 MPa and about 250 MPa, etc. In several embodiments, the tensile elastic modulus is measured in accordance with test method JIS K7127.

In several embodiments, tensile strength is measured using non-contact type extensometers capable of displacement measurements without affecting the sample properties are effective for accurately measuring the break strain of a film. In measuring such physical properties, the sample is gripped evenly, suppressing the occurrence of wrinkles. The grips are then used to stretch the sample.

In several embodiments, the multilayer film (or sidewall of an article comprising the multilayer film) has an Elmendorf tearing strength of equal to or at least about: 10 Newtons per millimeter (N/mm), 50 N/mm, 70 N/mm, 90 N/mm, 110 N/mm, 150 N/mm, 200 N/mm, 300 N/mm, 500 N/mm, or ranges including and/or spanning the aforementioned values. For example, in several embodiments, the multilayer film has an Elmendorf tearing strength ranging between about 10 N/mm and about 500 N/mm, between about 50 N/mm and about 300 N/mm, between about 90 N/mm and about 200 N/mm, etc. In several embodiments, the Elmendorf tearing strength is measured in accordance with test method JIS K7128.

In several embodiments, the multilayer film (or sidewall of an article comprising the multilayer film) has a Dart drop impact resistance of equal to or at least about: 0.3 N, 0.5 N, 0.8 N, 1 N, 1.2 N, 1.4 N, 1.6 N, 1.8 N, 2 N, 2.5 N, 3 N, 4

N, 5 N, 10 N or ranges including and/or spanning the aforementioned values. For example, in several embodiments, the multilayer film has a Dart drop impact resistance ranging between about 0.3 N and about 10 N, between about 0.5 N and about 5 N, between about 1.2 N and about 1.8 N, etc. In several embodiments, the Dart drop impact resistance is measured in accordance with test method ISO 7765-1.

In several embodiments, the multilayer film (or sidewall of an article comprising the multilayer film) has a strain at break of equal to or greater than about: 150%, 200%, 250%, 300%, 350%, 400%, 420%, 440%, 460%, 480%, 500%, 600%, 800%, or ranges including and/or spanning the aforementioned values. For example, in several embodiments, the multilayer film has a strain at break ranging between about 150% and about 800%, between about 200% and about 600%, between about 400% and about 460%, etc. In several embodiments, the strain at break is measured in accordance with test method ISO 527-3/2000.

In several embodiments, the multilayer film (or sidewall of an article comprising the multilayer film) has an elongation under a tensile force of equal to or less than about: 0.01%, 0.05%, 0.1%, 0.2%, 0.3%, 0.4%, 0.5%, 0.6%, 0.7%, 0.8%, 0.9%, 1%, 1.5%, or ranges including and/or spanning the aforementioned values. For example, in several embodiments, the multilayer film has an elongation under a tensile force ranging between about 0.01% and about 1.5%, between about 0.2% and about 1%, between about 0.5% and about 0.8%, etc. In several embodiments, the elongation is measured at a tensile force of about 3 N up to about 5 N per 25 mm width in accordance with test method DIN EN ISO 527-3.

In several embodiments, the multilayer film (or sidewall of an article comprising the multilayer film) has a tear resistance in the machine direction when compared to a tear resistance transversely to the machine direction of equal to or greater than about: 105%, 110%, 130%, 140%, 150%, 160%, 170%, 180%, 200%, 250% 300%, or ranges including and/or spanning the aforementioned values. For example, in several embodiments, the multilayer films has a tear resistance in the machine direction when compared to a tear resistance transversely to the machine direction ranging between about 100% and about 300%, between about 110% and about 250%, between about 130% and about 170%, etc. In several embodiments, the tear resistance in the machine direction is measured in accordance with test method DIN 53356 (trouser leg).

In several embodiments, the multilayer film (or sidewall of an article comprising the multilayer film) has a period of odor adsorption of equal to or greater than about: 0.5 month, 1 month, 2 months, 3 months, 6 months, 12 months, 2 years, or ranges including and/or spanning the aforementioned values. For example, in several embodiments, the multilayer films comprise a period of odor adsorption ranging between about 0.5 month and about 3 months, between about 1 month and about 2 months, between about 1 months about 2 years, etc.

In several embodiments, the multilayer film (or sidewall of an article comprising the multilayer film) has a period of degradation (e.g., when in a landfill) of equal to or less than about: 1 month, 3 months, 6 months, 9 months, 1 year, 2 years, or ranges including and/or spanning the aforementioned values. For example, in several embodiments, the multilayer films comprise a period of degradation ranging between about 1 month to about 3 months, between about 3 months and about 2 years, between about 1 month and about 2 years, etc.

In several embodiments, at least 50%, 60%, 70%, 80%, 90%, 95%, 99%, or 100% (or ranges including and/or spanning the aforementioned percentages) of the trash bag biodegrades in a period of 30 days, 2 months, 3 months, or 6 months (or ranges including and/or spanning the aforementioned time period values) in conditions provided by ASTM D5511-18. The ASTM D5511-18 test method covers the determination of the degree and rate of anaerobic biodegradation of plastic materials in high-solids anaerobic conditions. The test materials are exposed to a methanogenic inoculum derived from anaerobic digesters operating only on pretreated household waste. The anaerobic decomposition takes place under high-solids (more than 30% total solids) and static non-mixed conditions. This test method is designed to yield a percentage of conversion of carbon in the sample to carbon in the gaseous form under conditions found in high-solids anaerobic digesters, treating municipal solid waste. This test method may also resemble some conditions in biologically active landfills where the gas generated is recovered and biogas production is actively promoted by inoculation (for example, co-deposition of anaerobic sewage sludge, anaerobic leachate recirculation), moisture control (for example, leachate recirculation), and temperature control (for example, short-term injection of oxygen, heating of recirculated leachate). This test method is designed to be applicable to all plastic materials that are not inhibitory to the microorganisms present in anaerobic digesters operating on household waste.

In several embodiments, at least 50%, 60%, 70%, 80%, 90%, 95%, 99%, or 100% (or ranges including and/or spanning the aforementioned percentages) of the trash bag biodegrades in a period of 30 days, 2 months, 3 months, or 6 months (or ranges including and/or spanning the aforementioned time period values) in conditions provided by ASTM D5511-18. The ASTM D5511-18 test method covers determination of the degree and rate of anaerobic biodegradation of plastic materials in an accelerated-landfill test environment. This test method is also designed to produce mixtures of household waste and plastic materials after different degrees of decomposition under conditions that resemble landfill conditions. The test materials are mixed with pretreated household waste and exposed to a methanogenic inoculum derived from anaerobic digesters operating only on pretreated household waste. The anaerobic decomposition occurs under dry (more than 30% total solids) and static non-mixed conditions. The mixtures obtained after this test method can be used to assess the environmental and health risks of plastic materials that are degraded in a landfill. This test method is designed to yield a percentage of conversion of carbon in the sample to carbon in the gaseous form under conditions that resemble landfill conditions. It is possible that this test method will not simulate all conditions found in landfills, especially biologically inactive landfills. This test method more closely resembles those types of landfills in which the gas generated is recovered or even actively promoted, or both, for example, by inoculation (co-deposition of anaerobic sewage sludge and anaerobic leachate recirculation), moisture control in the landfill (leachate recirculation), and temperature control (short-term injection of oxygen and heating of recirculated leachate). This test method is designed to produce partially degraded mixtures of municipal solid waste and plastics that can be used to assess the ecotoxicological risks associated with the anaerobic degradation of plastics after various stages of anaerobic biodegradation in a landfill.

Manufacture of Films and Products Containing Such Films

As disclosed elsewhere herein, trash bags or other film articles capable of providing odor control may be manufactured from the multilayer films. In several embodiments, a method of manufacturing trash bags or other film articles from the multilayer films is provided.

In several embodiments, the method of manufacturing the trash bags or other film articles includes coextruding the multilayer film. In several embodiments, the method includes extruding a multilayer film comprising at least a first layer and a second layer. In several embodiments, the first layer comprises a biodegradable polymer. In several embodiments, the second layer comprises a biodegradable polymer and an odor absorbing agent. In several embodiments, the first layer provides an outside surface of the trash bag (or other article) and the second layer is located more proximally to the inside surface of the trash bag (or other article) than the first layer. In other embodiments, the second layer provides an outside surface of the trash bag (or other article) and the first layer is located more proximally to the inside surface of the trash bag (or other article) than the first layer.

In several embodiments, the method includes transferring a biodegradable polymer of a polymer composition into an extruding apparatus. In several embodiments, the method includes transferring a biodegradable polymer and an odor absorbing agent of an polymer composition into an extruding apparatus. In several embodiments, the extruding apparatus includes equipment capable to maintain the contents thereof at elevated temperatures and elevated pressures. In several embodiments, the elevated temperature within the extruding apparatus may be equal to or less than about: 60° C., 100° C., 200° C., 300° C., 400° C., 500° C., 600° C., or ranges including and/or spanning the aforementioned values. In several embodiments, the elevated pressure within the extruding apparatus may be from about: 15 pounds per square inch (psi), 50 psi, 100 psi, 200 psi, 300 psi, 400 psi, 500 psi, or ranges including and/or spanning the aforementioned values.

In several embodiments, a polymer composition (e.g., comprising a biodegradable polymer, absorbing agent, etc.) is processed in the extruding apparatus form an extrudate. Processing in the extruding apparatus includes exposing the polymer composition to an elevated temperature, exposing the polymer composition to an elevated pressure, or a combination thereof. In several embodiments, the polymer composition is exposed to a temperature from about 100° C. to about 300° C. In several embodiments, the polymer composition is exposed to a pressure from about 15 psi to about 80 psi. In several embodiments, the extruding apparatus includes a die and/or the extruding apparatus is otherwise fluidly connected to the die. In several embodiments, the extruding apparatus and the die are configured such that the extrudate enters the die and is formed into a shape by the die. In several embodiments, the shape includes any geometrical shape such as the nonlimiting examples of a cube, a sphere, a ring, or a sheet.

In several embodiments, the die forms the extrudate into a ring. The extruding apparatus, or the die, includes equipment capable to injected gas (e.g., pressurized) into the shape (e.g., a ring), formed by the die. In several embodiments, the ring formed from the extrudate is injected with pressurized gas. The pressurized gas may include air, an inert gas (nitrogen), combinations thereof, etc. In several embodiments, the method includes injecting the ring with pressurized gas to form a first bubble. The extruding apparatus, or the die, includes equipment capable to compress the first bubble. In several embodiments, the method includes compressing the first bubble to form a flat tube. In several embodiments, the method includes removing the flat tube from the die. In several embodiments, the method includes dividing the flat tube into a plurality of webs. In several embodiments, the method includes injecting each web of the plurality of webs with pressurized gas to form a plurality of second bubbles. In several embodiments, the method includes cutting each second bubble of the plurality of second bubbles to form a plurality of trash bags. In several embodiments, cutting includes separating the plurality of trash bags into individual trash bags. In several embodiments, the method includes sealing each trash bag of the plurality of trash bags.

In several embodiments, the die forms the extrudate into a first sheet. In several embodiments, the method includes folding and heat sealing the first sheet to provide a plurality of trash bags. In several embodiments, the first sheet is folded on a first side and on a second side. In several embodiments, the first sheet is heat sealed on a first side and on a second side. The method includes cutting, or otherwise separating the plurality of trash bags into individual trash bags.

In several embodiments, the method includes separating each trash bag from the plurality of trash bags. In several embodiments, the method includes folding the trash bags, stacking the trash bags and inserting the trash bags into packaging.

Enumerated Embodiments

The following provide exemplary illustrative enumerated embodiments. The scope of this disclosure should not be limited by the particular disclosed embodiments below, but should be determined only by a fair reading of the claims and the disclosure as a whole. Although the multilayer films have been disclosed in the context of certain embodiments and examples below and elsewhere herein, it will be understood by those skilled in the art that the composition of the films extends beyond the specifically disclosed embodiments to other alternative embodiments and/or uses of the embodiments and certain modifications and equivalents thereof. Additional combinations and features are also contemplated by the inventors. It should be understood that various features and aspects of the disclosed embodiments can be combined with or substituted for one another in order to form varying modes of the articles provided herein (e.g., trash bags). Thus, the scope of the embodiments disclosed herein should not be limited by the particular enumerated embodiments disclosed below.

1. A trash bag, comprising:
   a multilayer sidewall providing an inner surface of the trash bag, the multilayer sidewall having a thickness spanning from an outside surface of the trash bag to an inner surface of the trash bag, the multilayer sidewall comprising:
   at least a first layer and a second layer, the first layer comprising a biodegradable polymer and the second layer comprising a biodegradable polymer and an odor control agent;
   wherein the first layer provides the outside surface of the trash bag and the second layer is located more proximally to the inside surface of the trash bag than the first layer.

2. The trash bag of embodiment 1, wherein the first layer and the second layer are bonded to each other over a majority of a surface area of the first layer and the second layer.

3. The trash bag of embodiment 1 or 2, wherein the first layer comprises, consists of, or consists essentially of a bioplastic.

4. The trash bag of embodiment 3, wherein the bioplastic comprises, consists of, or consists essentially of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

5. The trash bag of any one of embodiments 1 to 3, wherein the biodegradable polymer of the first layer comprises, consists of, or consists a polymer derived from sugar cane.

6. The trash bag of any one of embodiments 1 to 3, wherein the biodegradable polymer of the first layer comprises, consists of, or consists essentially of a cellulose.

7. The trash bag of any one of embodiments 1 to 3, wherein the biodegradable polymer of the first layer comprises, consists of, or consists essentially of a polyethylene copolymer.

8. The trash bag of any one of embodiments 1 to 3, wherein the biodegradable polymer of the first layer comprises, consists of, or consists essentially of polyethylene copolymer 1-butene, 1-hexene.

9. The trash bag of any one of embodiments 1 to 8, wherein the trash bag further comprises a third layer that provides the inner surface of the bag, wherein the third layer comprises a biodegradable polymer.

10. The trash bag of embodiment 9, wherein the second layer and the third layer are bonded to each other over a majority of a surface area of the second layer and the third layer.

11. The trash bag of embodiment 9 or 10, wherein the third layer comprises, consists of, or consists essentially of a bioplastic.

12. The trash bag of embodiment 11, wherein the bioplastic of the third layer comprises, consists of, or consists essentially of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

13. The trash bag of any one of embodiments 9 to 11, wherein the biodegradable polymer of the third layer comprises, consists of, or consists essentially of a cellulose.

14. The trash bag of any one of embodiments 9 to 11, wherein the biodegradable polymer of the first layer comprises, consists of, or consists a polymer derived from sugar cane.

15. The trash bag of any one of embodiments 9 to 11, wherein the biodegradable polymer of the third layer comprises, consists of, or consists essentially of a polyethylene copolymer.

16. The trash bag of any one of embodiments 9 to 11, wherein the biodegradable polymer of the third layer comprises, consists of, or consists essentially of polyethylene copolymer 1-butene, 1-hexene.

17. The trash bag of any one of embodiments 1 to 16, wherein the second layer comprises a bioplastic.

18. The trash bag of embodiment 17, wherein the bioplastic of the second layer comprises, consists of, or consists essentially of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

19. The trash bag of any one of embodiments 9 to 18, wherein the first layer and/or the third layer comprise, consist of, or consist essentially of same composition.

20. The trash bag of embodiment 9 or 19, wherein the first layer and/or the third layer comprises, consists of, or consists essentially of a polyethylene copolymer.

21. The trash bag of embodiment 20, wherein the first layer and/or the third layer comprises, consists of, or consists essentially of polyethylene copolymer 1-butene, 1-hexene.

22. The trash bag of any one of embodiments 1 to 21, wherein the second layer comprises a cellulose.

23. The trash bag of any one of embodiments 1 to 21, wherein the second layer comprises a polyethylene copolymer.

24. The trash bag of embodiment 23, wherein the second layer comprises a polyethylene copolymer 1-butene, 1-hexene.

25. The trash bag of any one of embodiments 1 to 24, wherein the second layer comprises the biodegradable polymer at a weight percent of equal to or at least about 49%.

26. The trash bag of any one of embodiments 1 to 25, wherein the odor control agent is an odor absorbing agent.

27. The trash bag of any one of embodiments 1 to 26, wherein the odor control agent comprises, consists of, or consists essentially of charcoal.

28. The trash bag of any one of embodiments 1 to 26, wherein the second layer comprises the odor control agent at a weight percent of equal to or at least 1%.

29. The trash bag of any one of embodiments 1 to 28, wherein the second layer comprises a post-consumer recycled material (PCR).

30. The trash bag of embodiment 29, wherein the PCR comprises recycled paper.

31. The trash bag of embodiment 29 or 30, wherein the PCR comprises recycled plastic.

32. The trash bag of any one of embodiments 29 to 31, wherein the second layer comprises PCR at a weight percent of equal to or at least about 50%.

33. The trash bag of any one of embodiments 1 to 29, wherein the second layer has a thickness that is equal to or greater than the thickness of the first layer.

34. The trash bag of any one of embodiments 9 to 33, wherein the second layer has a thickness that is equal to or greater than the cumulative thickness of the first layer and third layer.

35. The trash bag of any one of embodiments 1 to 34, wherein a minimum of 70% of the trash bag biodegrades by 30 days (ASTM D5511-18) or the duration of the testing procedure (ASTM D5526-18) under anaerobic conditions.

36. A multilayer film comprising:
at least a first layer and a second layer, the first layer comprising a biodegradable polymer and the second layer comprising a biodegradable polymer and an odor absorbing agent;
wherein the second layer has a thickness that is greater than the thickness of the first layer.

37. A trash bag, comprising:
a multilayer sidewall providing an inner surface of the trash bag, the multilayer sidewall having a thickness spanning from an outside surface of the trash bag to an inner surface of the trash bag, the multilayer sidewall comprising:

at least a first layer, second layer, and third layer, the first layer and third layer comprising a biodegradable polymer and the second layer comprising a biodegradable polymer and an odor absorbing agent;

wherein the first layer provides the outside surface of the bag;

wherein the third layer provides the inner surface of the bag;

wherein the second layer is bonded between the first layer and third layer; and wherein the second layer has a thickness that is greater than the thickness of the combined thickness of the first layer and third layer.

38. A method of manufacturing the film or trash bag of any one of embodiments 1 to 37, the method coextruding the multilayer film.

39. A method of manufacturing a trash bag, comprising:

coextruding a multilayer film, wherein the multilayer film comprises at least a first layer and a second layer, the first layer comprising a biodegradable polymer and the second layer comprising a biodegradable polymer and an odor absorbing agent;

wherein the first layer provides the outside surface of the bag and the second layer is located more proximally to the inside surface of the trash bag than the first layer.

40. The method of embodiment 39, wherein the biodegradable polymer and the odor absorbing agent are transferred into an extruding apparatus.

41. The method of embodiment 39 or 40, wherein the biodegradable polymer and the odor absorbing agent are processed to form an extrudate.

42. The method of any one of embodiments 39 to 41, wherein the biodegradable polymer and the odor absorbing 52. The method of embodiment 51, wherein the first sheet is folded and heat sealed on a first and second side to provide a plurality of trash bags.

53. The method of any one of embodiments 39 to 52, wherein each trash bag is separated from the plurality of trash bags, folded, stacked and inserted into packaging.

EXAMPLES

Example 1

The following provides an exemplary method of preparing a multilayer film as disclosed herein. The multilayer film (e.g., for use as a trash bag sidewall) was prepared using conventional coextrusion techniques. The first and third layers were designed to provide desirable material properties to the film (e.g., were resilient layers). The middle (e.g., second layer) provided desirable material properties for the film but also comprised an odor reducing additive. This odor reducing additive was added to reduce the smell of the contents of the trash bag when in use. The first layer comprised 92.5% linear low density polyethylene (LLDPE), a whitening dye, a slip agent, and an anti-block agent. The third layer comprised 96.2% linear low density polyethylene (LLDPE), a slip agent, and an anti-block. Slip agents overcome the resins' natural tackiness so they can move smoothly through converting and packaging equipment. Anti-block additives reduce blocking at the surface of polymer films and other plastic articles to allow easier processing. The second layer comprised 86% linear low density polyethylene PCR (LLDPE), 2% desiccant, and 12% of a master batch composition (comprising 15% odor absorbing material and 85% linear low density green polyethylene homopolymer). Table 1, below, shows the composition of each layer.

TABLE 1

| A (20% thickness) | B (60% thickness) | C (20% thickness) | Thickness |
|---|---|---|---|
| 92.2% SLH0820/30AF White 4% Slip 3% AB 0.8% | 12% Masterbatch 15% Cabot Norit 5A UF carbon 85% SBC818 86% 410000 EFS LDPE PCR 2% EFS desiccant | 96.2% SLH0820/30AF Slip 3% AB 0.8% | 1.38 mil | agent are exposed to an elevated temperature, an elevated pressure or a combination thereof.

43. The method of any one of embodiments 41 to 42, where a die forms the extrudate into a ring.

44. The method of embodiment 43, wherein the ring is injected with pressurized gas to form a first bubble.

45. The method of embodiment 44, wherein the first bubble is compressed to form a flat tube.

46. The method of embodiment 45, wherein the flat tube is removed from the die.

47. The method of embodiment 45 or 46, wherein the flat tube is divided into a plurality of webs.

48. The method of embodiment 47, wherein each web of the plurality of webs is injected with pressurized gas to form a plurality of second bubbles.

49. The method of embodiment 48, wherein each second bubble of the plurality of second bubbles is cut to form a plurality of trash bags.

50. The method of embodiment 49, wherein each trash bag of the plurality of trash bags is sealed.

51. The method of embodiment 43, wherein a die forms the extrudate into a first sheet.

The three layers were coextruded to provide a multilayer film. The multilayer film had a first, external layer providing 20% of the total film thickness, a middle layer (Layer B) providing 60% of the total film thickness, and a third, internal layer providing 20% of the total film thickness. The total film thickness was 1.38 mm. The first and third layers comprised LLDPE of PE copolymer 1-butene, 1-hexene (Cas 60785-11-7).

Example 2

Figure 2:
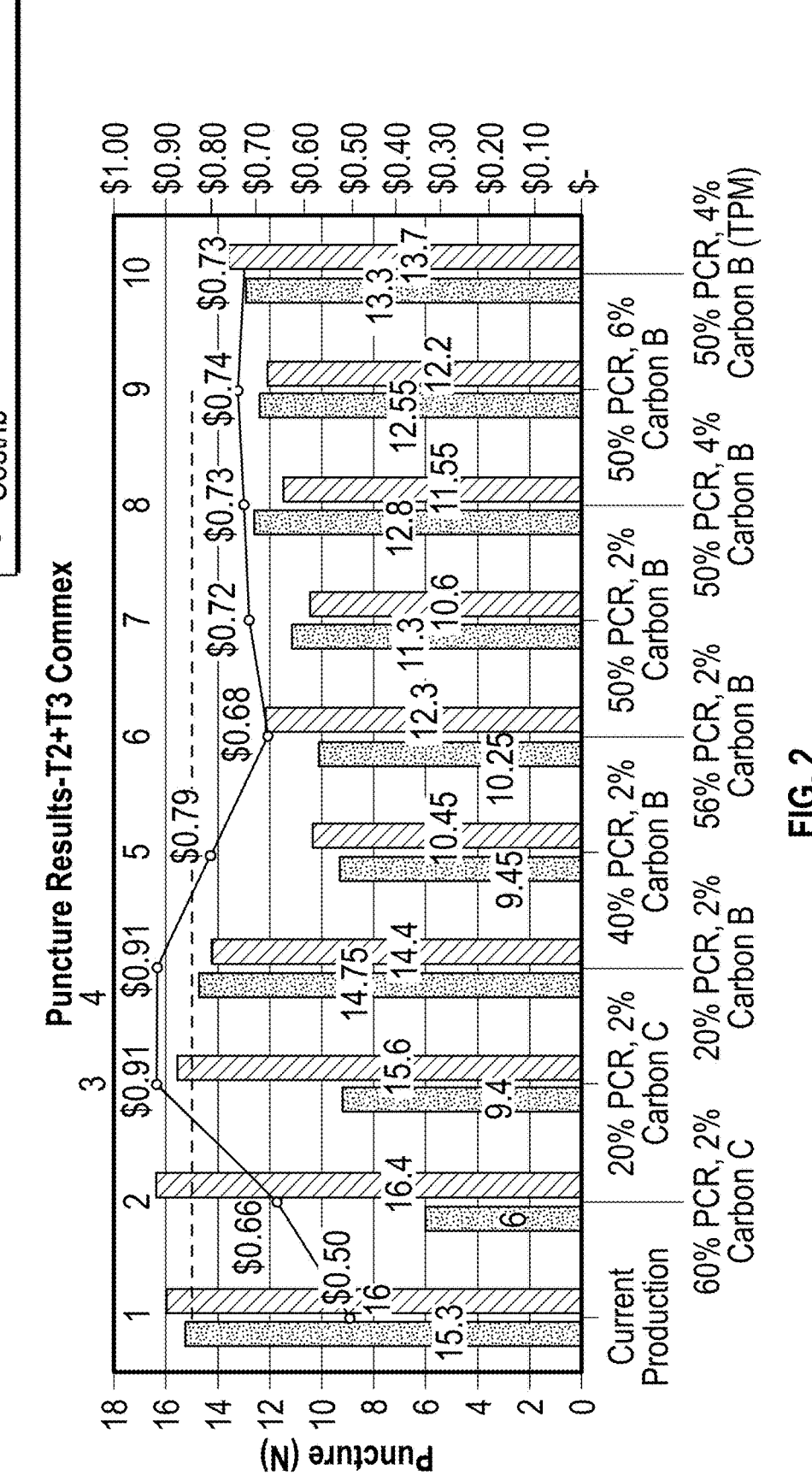
FIG. 2 provides puncture results for several multilayer films as disclosed herein versus a control film not comprising an odor absorbing layer. The puncture results are obtained using standard trash bag puncture test techniques.

The material properties of trash bags comprising the odor absorbing polymer films were tested. As shown in FIG. 2, various polymer films having odor absorbing layers with different components were subject to puncture testing. As shown in FIG. 2, a trash bag comprising a multilayer film as disclosed herein had puncture resistance similar to a trash bag lacking an odor absorbing layer. In FIG. 2, the % PCR indicates the thickness of the second layer (where the thickness of the first and third layer are equal or approximately equal). For instance, the Entry 1 "Current Production" entry provides a control trash bag having no odor absorbing second layer. Entry 2 provides a bag having a second layer that makes up 60% of the total film thickness (leaving the first and third layers having thicknesses of 20% and 20%, respectively). Additionally, the Entry 2 bag includes 2% odor absorbing carbon in the second layer (by weight). Entry 3 provides a bag having a second layer that makes up 20% of the total film thickness (leaving the first and third layers having thicknesses of 40% and 40%, respectively). Additionally, the Entry 3 bag includes 2% odor absorbing carbon in the second layer (by weight). There are 10 total entries moving left to right in FIG. 2.

Figure 3:
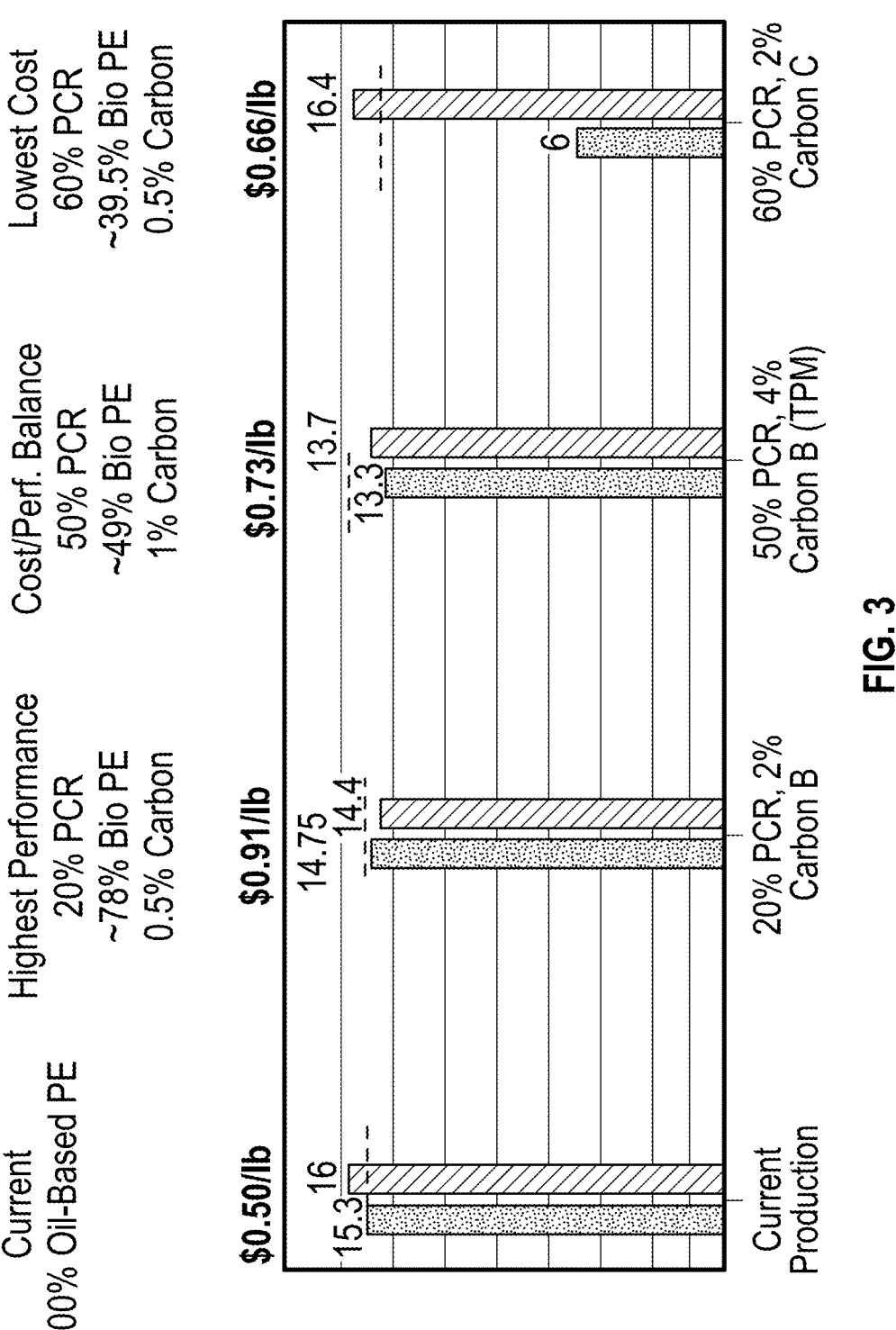
FIG. 3 provides puncture results and production costs for several multilayer films as disclosed herein versus a control film not comprising an odor absorbing layer. In several embodiments, trash bags formed from the films disclosed herein are advantageously economically produced, have improved material properties (and/or material properties sufficient for use as a trash bag), and are biodegradable (making them environmentally friendly).

FIG. 3 provides a cost balance for odor absorbing polymer films as disclosed herein versus a control. As shown, Entry 2 of FIG. 2 and shown in FIG. 3, provides a low cost alternative to the control bag. The puncture resistance ratio from inside to outside the bag is 6:16.4 (between 1:3 and 1:2). Entry 4 of FIG. 2 and shown in FIG. 3, provides a high performance alternative to the control bag. The puncture resistance ratio from inside to outside the bag is about 1:1 (14.75:14.4). Entry 10 of FIG. 2 and shown in FIG. 3, provides a high performance cost balanced alternative to the control bag. The puncture resistance ratio from inside to outside the bag is about 1:1 (13.3:13.7).

Example 3

The odor absorbing ability of odor absorbing polymer films as disclosed herein were tested and compared to a control film. Briefly, test trash bags were prepared by heat sealing polymer film sheets together. A bottom seam and two side seams were prepared. The bags were placed in trashcans and equal amounts of trash (which included food waste) were added to each trashcan. The sample labeled "Regular liner" was a control bag having no odor absorbing properties. The sample labeled "Regular liner+Odorsorb Filter" is another control having a carbon filter located within the trashcan. The third and fourth embodiments comprised bags as disclosed herein, one with a 2% carbon liner and the other with a 6% carbon liner in the three layer trash bag.

Figure 4:
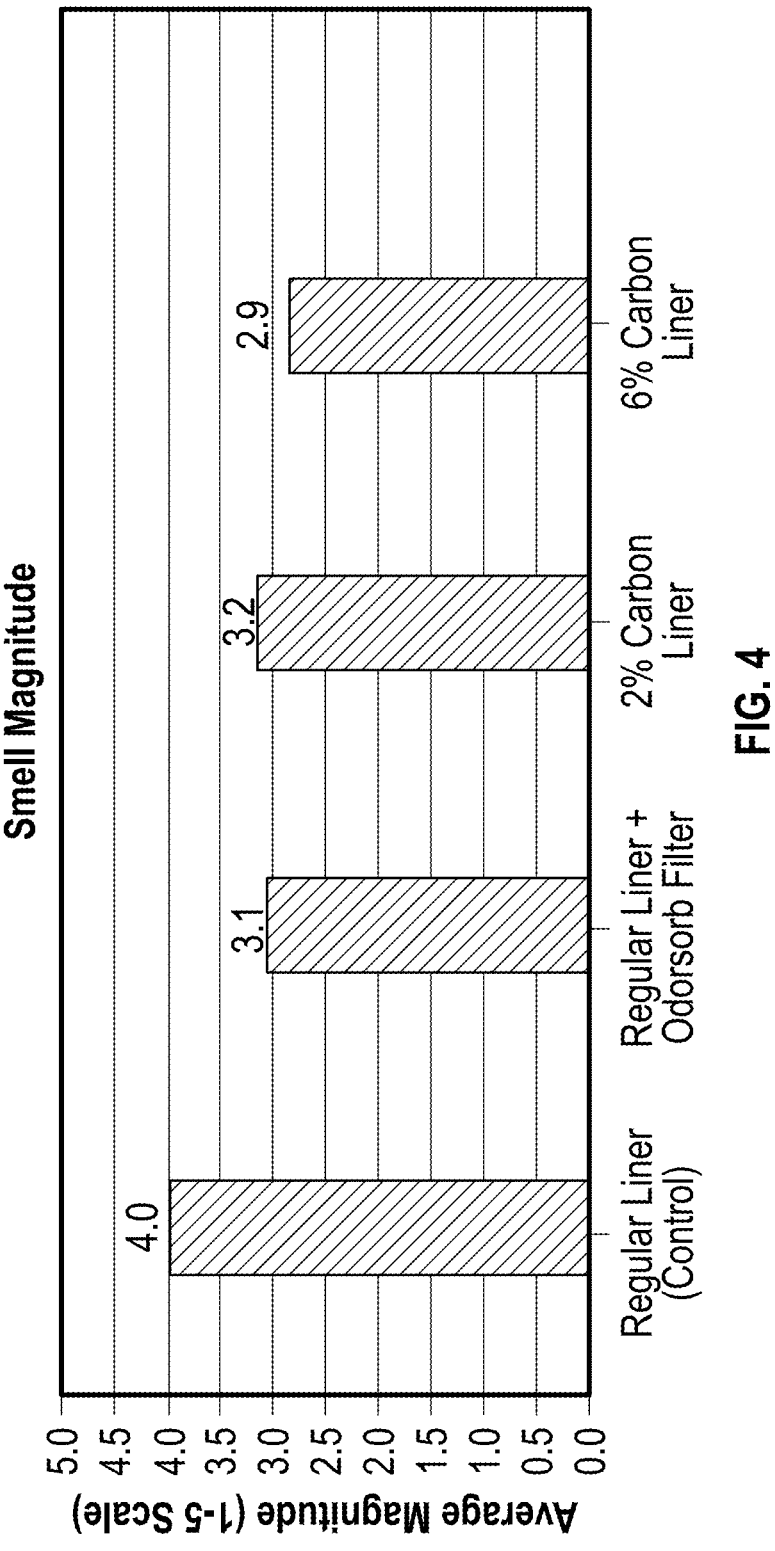
FIG. 4 provides odor reduction results for several trash bags comprising multilayer films as disclosed herein versus a control trash bag not comprising an odor absorbing layer.

After a period of time, smell testers rated the level of odor emanating from each trashcan (and/or trash bag). In FIG. 4, 5 is the strongest smell magnitude and 1 is the smallest smell magnitude. As shown in FIG. 4, a trash bag comprising a multilayer film as disclosed herein had improved odor absorbing properties versus one lacking an odor absorbing layer. The multilayer film also absorbed odor in a comparable fashion to using the Odorsorb filter (e.g., the multilayer film has an odor absorption capacity within equal to or less than about 5%, 2%, or 1% (or ranges including and/or spanning the aforementioned values) of the smell absorbing magnitude of a control using an Odorsorb filter). In several embodiments, the multilayer film provides improved odor adsorption compared to the control trash bag or the control trash bag in combination with an Odorsorb filter (e.g., a smell reduction that, relative to a control as disclosed herein, is greater by equal to or at least about: 30%, 25%, 20%, 15%, 10%, 5%, 2%, 1%, or ranges including and/or spanning the aforementioned values).

Although multilayer films have been disclosed in the context of certain embodiments and examples, it will be understood by those skilled in the art that the composition and arrangement of the films extends beyond the specifically disclosed embodiments to other alternative embodiments and/or uses of the embodiments and certain modifications and equivalents thereof. It should be understood that various features and aspects of the disclosed embodiments can be combined with or substituted for one another in order to form varying embodiments of the articles (e.g., trash bags) provided herein. Additional combinations and features are also contemplated by the inventors. The layers may be mixed and matched to provide a number of films with tailored strengths, stabilities, and odor control abilities. Thus, the scope of the inventions herein-disclosed should not be limited by the particular disclosed embodiments described above.

What is claimed is:

1. A trash bag, comprising:
a multilayer sidewall providing an inner surface of the trash bag, the multilayer sidewall having a thickness spanning from an outside surface of the trash bag to the inner surface of the trash bag, the multilayer sidewall comprising:
at least a first layer, a second layer, and a third layer, the first layer comprising a biodegradable polymer, the second layer comprising a post-consumer recycled (PCR) plastic, and an odor control agent, and the third layer comprising a biodegradable polymer,
wherein the first layer provides the outside surface of the trash bag and the second layer is located more proximally to the inner surface of the trash bag than the first layer, wherein the second layer provides a pathway for odors to reach the odor control agent, and wherein the second layer is biodegradable,
wherein the second layer comprises the PCR plastic at a weight percent of equal to or at least about 50% and wherein the second layer comprises the odor control agent at a weight percent of equal to or at least about 1%.

2. The trash bag of claim 1, wherein the first layer and the second layer are bonded to each other over a majority of a surface area of the first layer and the second layer.

3. The trash bag of claim 1, wherein the biodegradable polymer of the first layer comprises a bioplastic.

4. The trash bag of claim 3, wherein the bioplastic comprises a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

5. The trash bag of claim 1, wherein the third layer provides a puncture resistance at least about 7 N.

6. The trash bag of claim 5, wherein the second layer and the third layer are bonded to each other over a majority of a surface area of the second layer and the third layer.

7. The trash bag of claim 5, wherein the biodegradable polymer of the third layer comprises a bioplastic.

8. The trash bag of claim 7, wherein the bioplastic of the third layer is selected from the group consisting of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

9. The trash bag of claim 1, wherein the PCR plastic is a bioplastic.

10. The trash bag of claim 9, wherein the bioplastic of the second layer is selected from the group consisting of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

11. The trash bag of claim 5, wherein the first layer and the third layer comprise the same biodegradable polymer.

12. The trash bag of claim 1, wherein the odor control agent is an odor absorbing agent.

13. The trash bag of claim 1, wherein the odor control agent comprises charcoal.

14. The trash bag of claim 1, wherein the second layer comprises the odor control agent at a weight percent of equal to or at least 2%.

15. A multilayer film comprising:

at least a first layer, a second layer, and a third layer, the first layer comprising a biodegradable polymer, the second layer comprising a post-consumer recycled (PCR) plastic and an odor control agent, and the third layer comprising a biodegradable polymer, wherein the second layer has a thickness that is greater than the thickness of the first layer, wherein the second layer provides a pathway for odors to reach the odor control agent, and wherein the second layer is biodegradable, wherein the second layer comprises the PCR plastic at a weight percent of equal to or at least about 50% and wherein the second layer comprises the odor control agent at a weight percent of equal to or at least about 1%.

16. The trash bag of claim 1, wherein the second layer comprises the PCR plastic at a weight percent of equal to or at least about 50%.

17. The multilayer film of claim 15, wherein the biodegradable polymer of the first layer comprises a bioplastic.

18. The multilayer film of claim 17, wherein the bioplastic comprises a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

19. The multilayer film of claim 15, wherein the biodegradable polymer of the third layer comprises a bioplastic.

20. The multilayer film of claim 17, wherein the bioplastic of the third layer is selected from the group consisting of a polyhydroxyalkanoate (PHA), a polylactic acid (PLA), a degradable polyethylene, a starch blend, a polysaccharide material, a petroleum-based plastic, a polyglycolic acid, a polybutylene succinate, a polycaprolactone, polyvinyl alcohol, polybutylene adipate terephthalate, or a combination of any of the foregoing.

21. The multilayer film of claim 15, wherein the second layer comprises the PCR plastic at a weight percent from about 60% to about 95%.

22. The multilayer film of claim 15, wherein the second layer comprises the odor control agent at a weight percent of equal to or at least 2%.

23. The multilayer film of claim 21, wherein the odor control agent comprises charcoal.

24. The trash bag of claim 1, wherein the PCR plastic comprises a bioplastic and the PCR plastic is at a weight percent from about 60% to about 95%, wherein the odor control agent comprises charcoal.

25. The trash bag of claim 1, wherein the biodegradable polymer of the first layer comprises a linear low density polyethylene and the biodegradable polymer of the third layer comprises a low density polyethylene.

26. The multilayer film of claim 15, wherein the PCR plastic comprises a bioplastic and the PCR plastic is at a weight percent of equal from about 60% to about 95%, wherein the odor control agent comprises charcoal.

27. The multilayer film of claim 15, wherein the biodegradable polymer of the first layer comprises a linear low density polyethylene and the biodegradable polymer of the third layer comprises a low density polyethylene.

\*    \*    \*    \*    \*